Dec. 26, 1967      J. R. B. WALKDEN      3,359,619

APPARATUS FOR ASSEMBLING HYPODERMIC NEEDLES AND BARRELS

Filed Sept. 29, 1965      5 Sheets-Sheet 1

INVENTOR.
JOHN R. B. WALKDEN

BY    *E. J. Holler*
       *W. A. Schaich*
       ATTORNEYS

INVENTOR.
JOHN R. B. WALKDEN

United States Patent Office 3,359,619
Patented Dec. 26, 1967

3,359,619
APPARATUS FOR ASSEMBLING HYPODERMIC NEEDLES AND BARRELS
John R. B. Walkden, Toledo, Ohio, assigor to Owens-Illinois, Inc., a corporation of Ohio
Filed Sept. 29, 1965, Ser. No. 491,268
20 Claims. (Cl. 29—208)

ABSTRACT OF THE DISCLOSURE

The apparatus for assembling hypodermic needles and glass barrels disclosed herein comprises a turret which is rotated and on which a plurality of vertically reciprocable barrel holding chucks are provided. A plurality of needle holding chucks are also mounted on the turret for rotation with the turret and in overlying relation to the barrel holding chucks. Guide means rotatable with the needle chucks guide a needle to each needle chuck. At one station along the path of movement, needles are successively fed to the guide means. At another station, adhesive applying means are provided for applying adhesive to the needles. Means are also provided for moving the barrel holding chuck upwardly and downwardly as the turret rotates to move a barrel into position where the needle that is held above the barrel is inserted in the barrel.

---

This invention relates to assembling hypodermic needles and barrels and particularly hypodermic needles and glass barrels.

It is an object of this invention to provide a machine for assembling hypodermic needles continuously, efficiently and economically.

Figure 1:
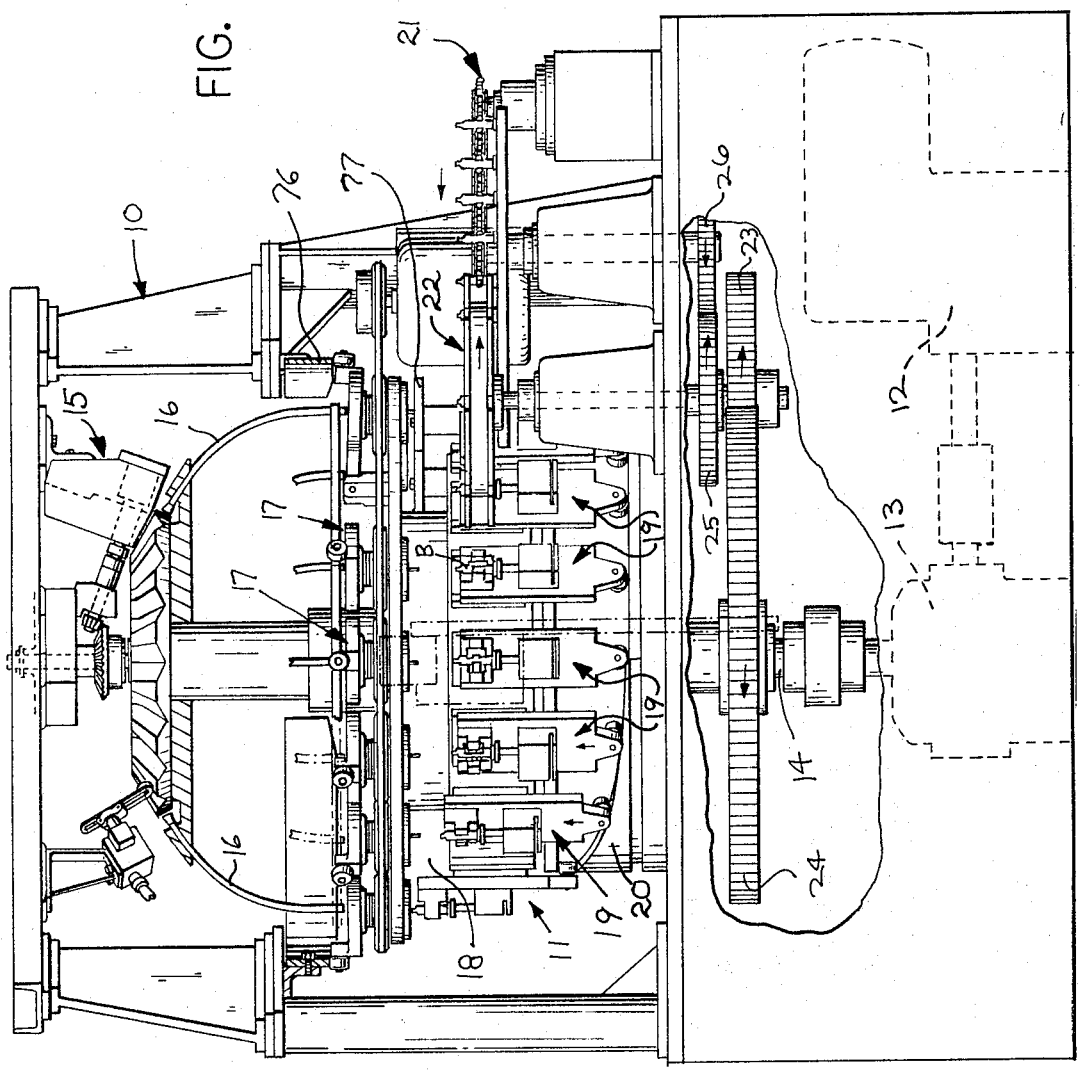
FIG. 1 is a part sectional elevation of a machine embodying the invention.
Figure 2:
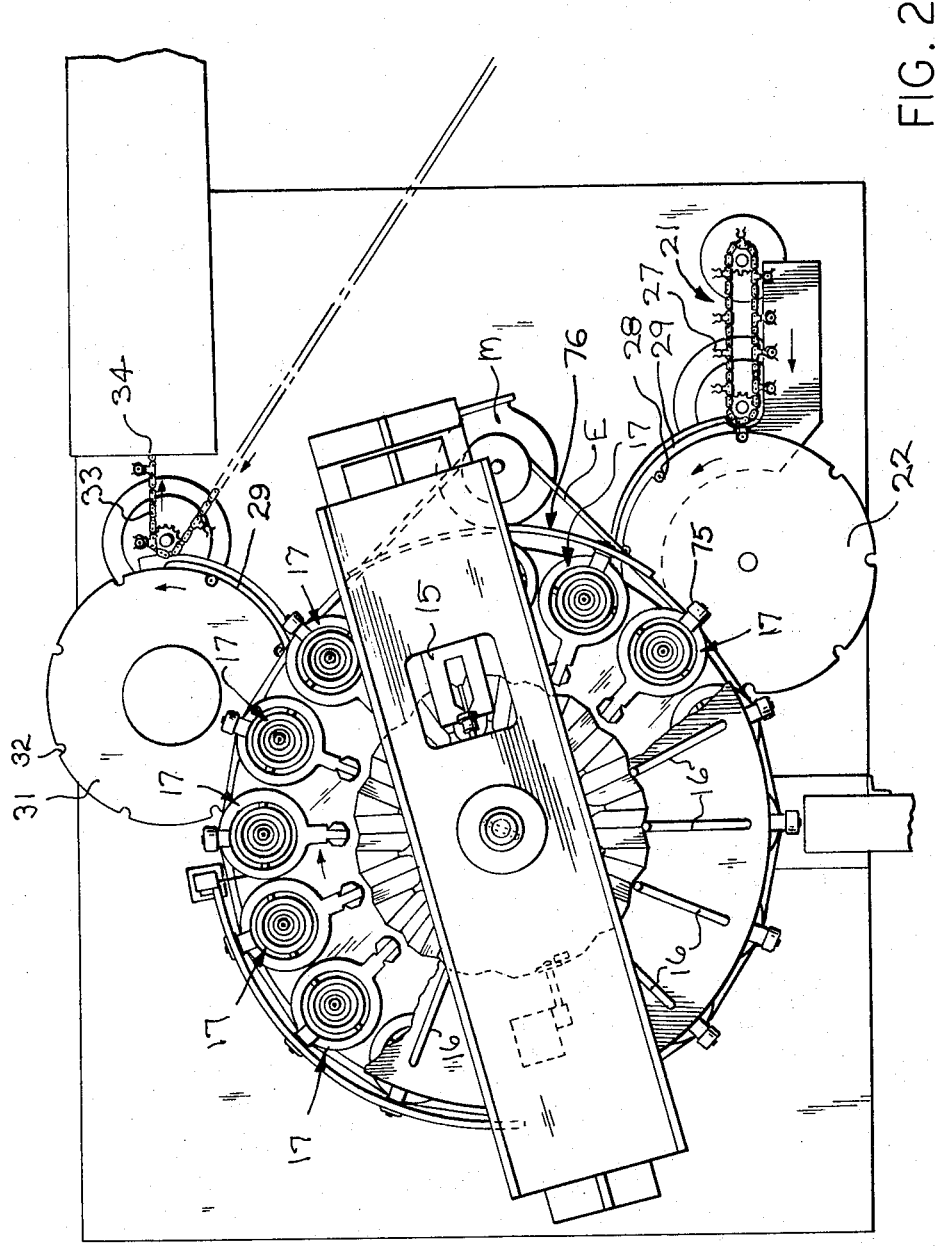
FIG. 2 is a plan view of the machine, parts being broken away.

Referring to FIGS. 1 and 2, the machine embodying the invention comprises a base frame 10 on which a turret 11 is mounted for rotation. The turret is rotated by a motor 12 through a getar box 13 that in turn drives the main shaft 14 which is connected to the turret. The hypodermic needles are fed from a supply source by a needle feeding mechanism 15 through guide tubes 16 to the needle holding chucks 17 that are mounted on the turret 11.

The turret 11 includes a hub 18 on the circumference of which barrel holding chuck assemblies 19 are mounted for vertical reciprocating movement by engagement with a cam 20. The hypodermic syringe barrels B are fed by a suitable mechanism 21 or by hand to a rotary feed table 22 and in turn to the chuck assemblies 19. As shown in FIG. 1, the rotary feed table 22 is rotated by a gear connection including a gear 23 on the shaft thereof which meshes with a gear 24 on the shaft 14. The feed mechanism 21 in turn receives its drive through sprockets 25, 26 and a chain arrangement. The infeed mechanism 21 comprises spring fingers 27 to which the barrels are fed automatically or by hand and which, in turn, deliver the barrels to the pockets 28 in the periphery of the feed table 22. A guide member 29 engages and strips a barrel B from the fingers 27 and maintains the barrel B in a pocket 28 until it is delivered to the fingers of a chuck 19 as presently described.

As seen in FIG. 1, the arrangement of the needle holding chuck 17 and barrel holding chuck assemblies 19 is such that they are vertically aligned so that a pair moves in unison as the turret 11 rotates. As a needle N is fed to a chuck 17, it is opened in a manner presently described and then closed to grip the needle. As a barrel B is fed to a chuck assembly 19, it is gripped. Continued movement of the turret brings the lower end of each needle adjacent an adhesive applying mechanism 30 (FIG. 3) which applies adhesive to the lower end of the needle. Continued rotation of the turret 11 causes the barrel holding chuck assembly 19 to move on along an upwardly inclined portion of the cam 20 causing the barrel B to be moved upwardly so that the needle enters the restricted upper end of the barrel. As the table continues to rotate, the needle holding chuck 17 is opened so that the barrel and needle which have been assembled are suported entirely by the barrel holding chuck assembly 19. Finally, as viewed in FIG. 2, a removal table 31, having a guide member 29 and pockets 32 in the periphery thereof, strips the assembled needle and barrel from the chuck assembly 19 and delivers it to the fingers 33 of a chain 34 where it is carried away to a subsequent operation for setting of the adhesive in the event that it is not already set.

Needle feeding mechanism

Figure 4:
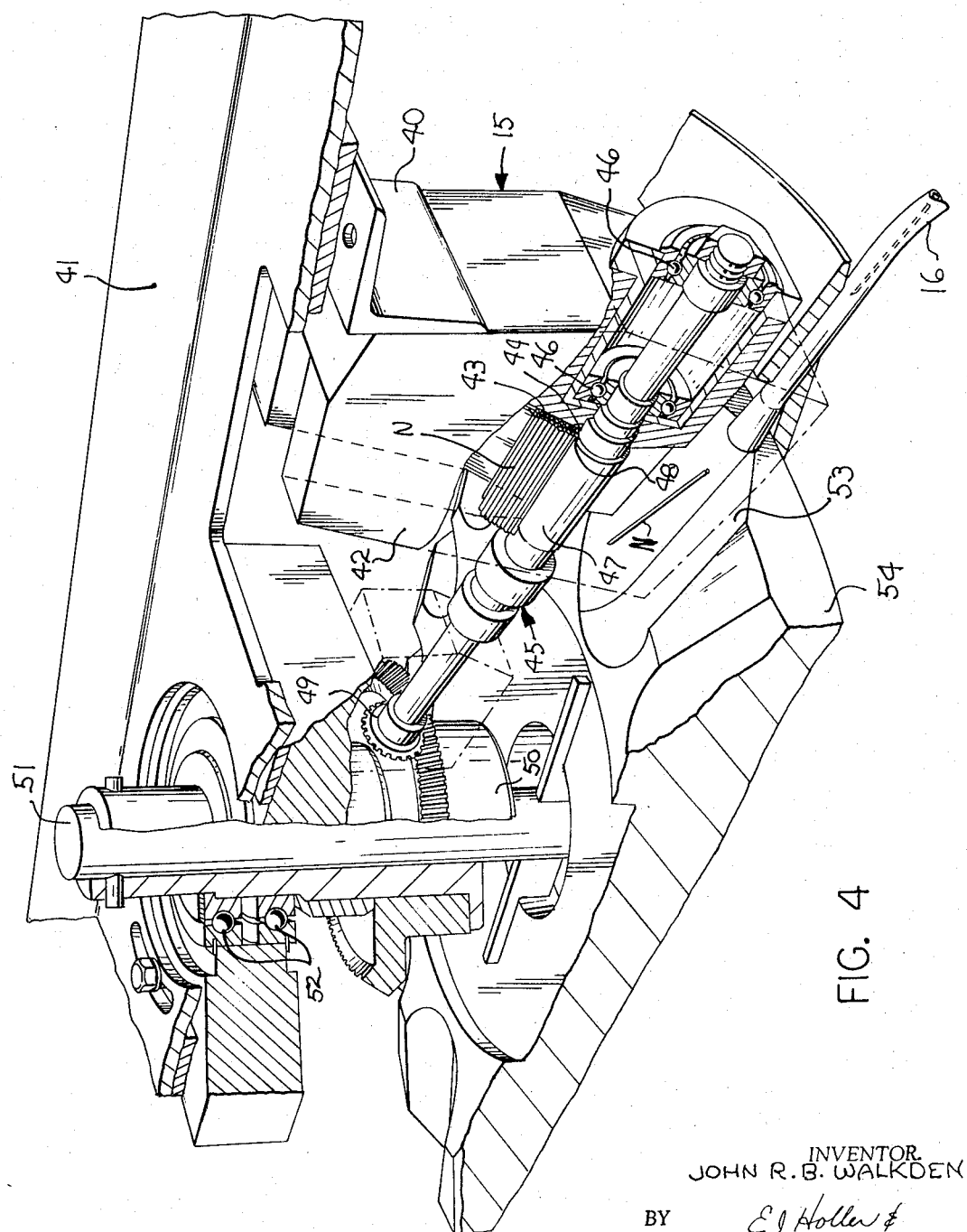
FIG. 4 is a fragmentary sectional perspective view of the hypodermic needle feeding mechanism.

Referring to FIG. 4, the needle feeding mechanism 15 comprises a housing 40 that is mounted on a cross arm 41 of the frame 10. The housing 40 includes an open-ended cavity 42 that forms a bin or reservoir for the needles. The lower end of the cavity 42 has tapered surfaces 43 that extends to a slot 44 which has a width large enough to accommodate a single needle. A needle dispensing shaft 45 is journalled in the housing 40 by bearings 46 and has a central portion 47 with four longitudinal pockets 48 therein. When the shaft 45 is rotated, the pockets 48 are brought successively below the slot 44 and strip a needle from the cavity 42. The shaft 45 is driven from the main shaft 14 by an arrangement which includes a bevel gear 49 on the shaft 45 which meshes with a bevel gear 50 fixed on an extension 51 on the upper end of the shaft 14. The extension 51 is journalled in the cross frame 41 by bearings 52.

Figure 3:
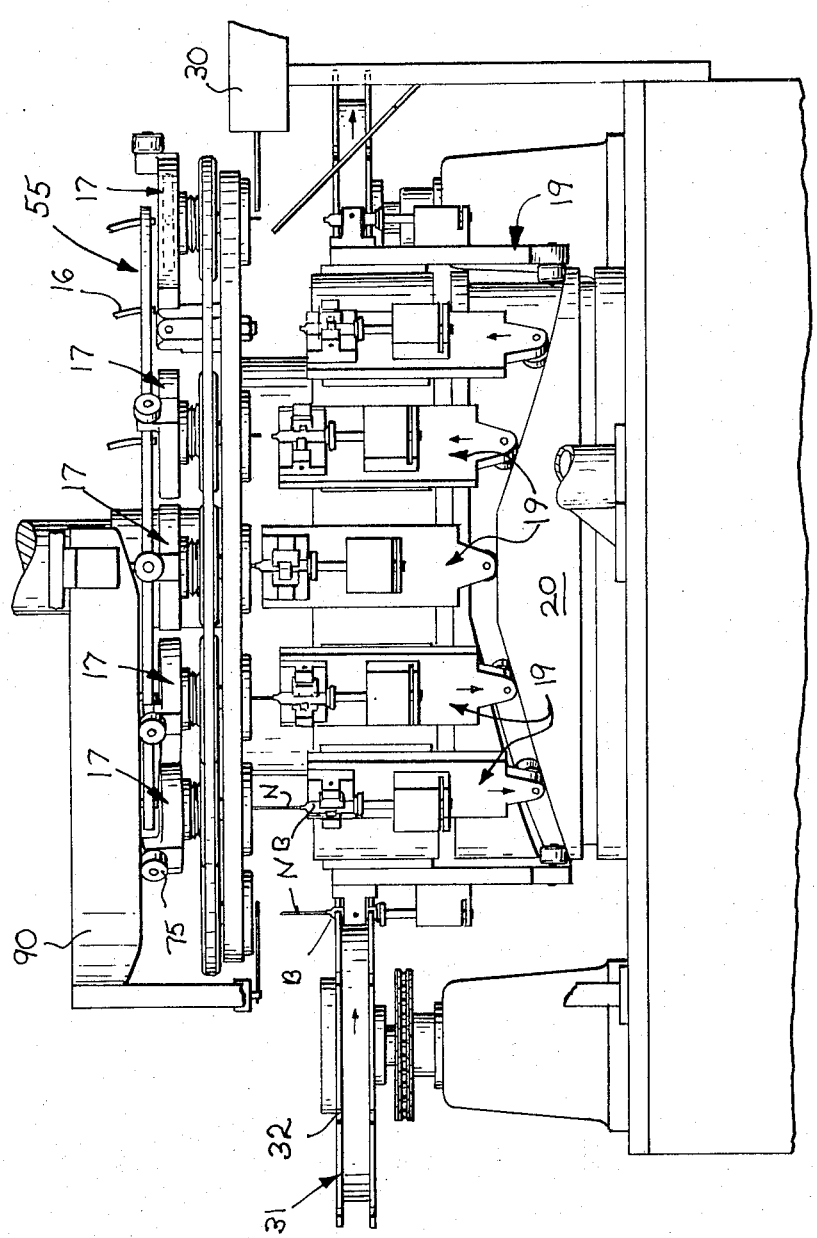
FIG. 3 is a side elevational view of the machine taken from the left as viewed in FIG. 1, parts being broken away.

When the shaft 45 is rotated and a needle is stripped from the cavity 42, the needle falls onto a guide groove 53 on a guide plate 54 fixed on the shaft 51. The surfaces of each guide groove 53 are tapered inwardly and downwardly to guide the needle to the upper end of a tube 16, one tube 16 being associated with each guide groove 53. The lower end of each guide tube 16 extends to a plate 55 and through the plate into overlying relationship with a needle chuck 17 (FIG. 3).

Needle chuck construction

Figure 5:
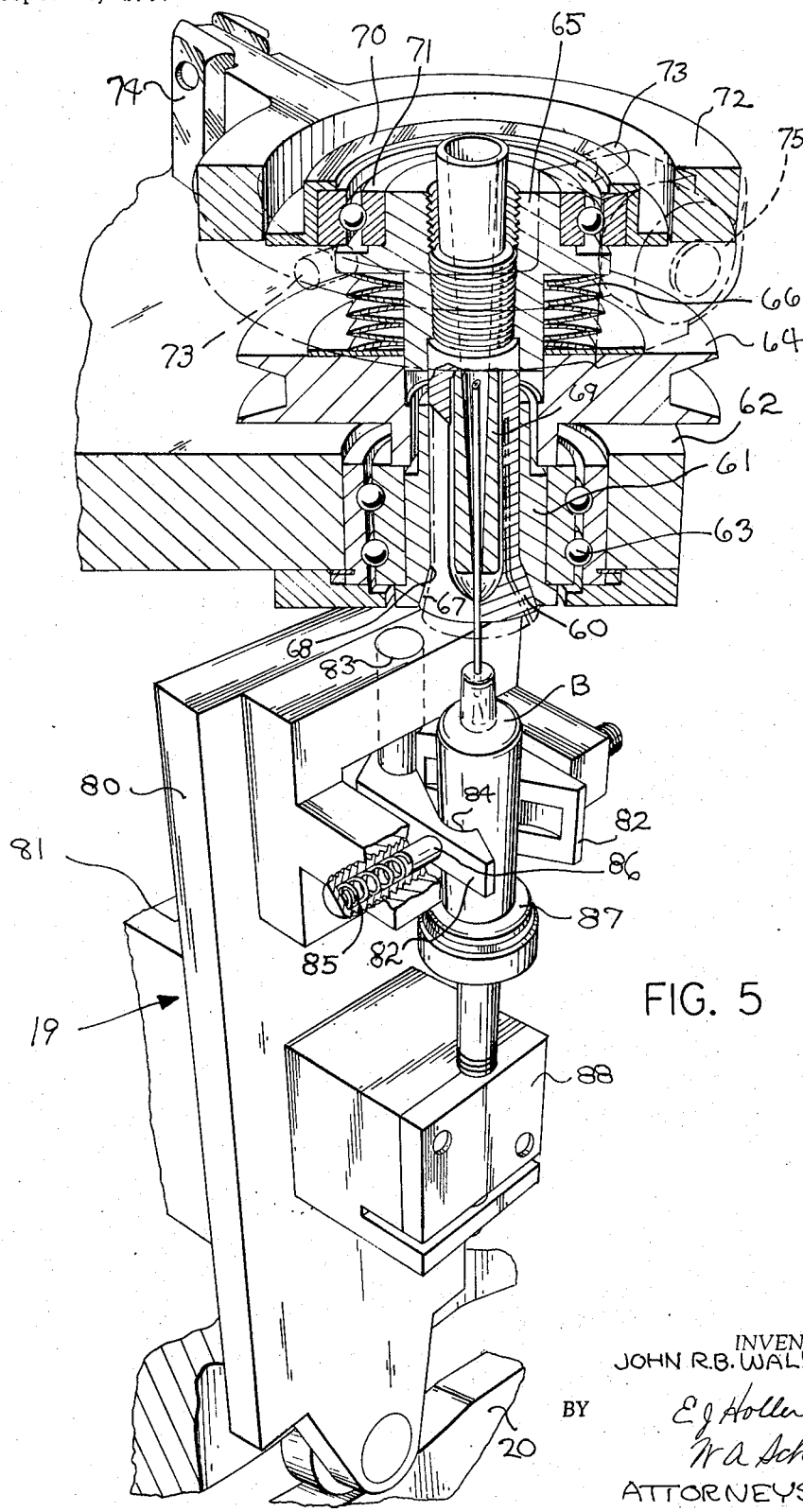
FIG. 5 is a fragmentary sectional perspective view of the needle holding chuck and a barrel holding chuck.

Referring to FIG. 5, each needle holding chuck 17 comprises an expandable slotted collet 60 that is mounted for reciprocating movement vertically in a sleeve 61 that is journaled in a plate 62 which, in turn, is fixed for rotation with the shaft 14. Bearings 63 are interposed between the sleeve 61 and the plate 62. A pulley 64 is fixed on each sleeve 61. A collar 65 is threaded on the upper end of each collet 60 and a plurality of Belleville springs 66 are interposed between the collar 65 and the pulley 64 thereby urging the collet 60 upwardly relative to the sleeve 61. The collet 60 and the sleeve 61 have complementary tapered contacting surfaces 67, 68, respectively, so that when the collet 60 is urged upwardly, the tapered surfaces cause the lower end of the collet sections to move inwardly and engage a needle interposed therebetween. A guide member 69 extends downward within the collet 60.

The upper end of the collar 65 is journalled in a ring 70 by a ball bearing 71. The ring 70 is in turn mounted for pivotal movement about a generally horizontal axis within an annular actuating arm 72 by pins 73. Each actuating arm is pivoted to a bracket 74 on the table 62 and has a roller 75 thereon.

During various portions of the rotation of the turret, cams engage the roller 75 to move the actuating arm 72 downwardly and thereby compress Belleville spring 66 and in turn move the collet 60 downwardly to permit the sections of the collet to spring outwardly. Specifically, when each chuck 17 is beneath the needle feed mechanism 15, a cam 76 (FIG. 1) engages the roller 75 to move the actuating arm 72 downwardly and open the collet 60. Thus, when a needle is fed by the mechanism to the guide groove 53 and in turn to the tube 16, it falls downwardly under the action of gravity into the open collet 60. The lower end of the needle engages a stop plate 77 beneath the path of the collets so that the needle stops in predetermined relation to the collet 60 (FIG. 1).

As shown in FIG. 2, an endless belt E is driven by a motor M continuously and engages the pulleys 64 on the needle holding chucks to rotate the collets. As shown in FIG. 2, the belt E is out of engagement with the pulleys during the delivery of the needles to the collets.

Barrel holding chuck assembly

Referring to FIG. 5, each barrel holding chuck assembly 19 comprises a vertical slide 80 that is mounted for reciprocating movement in ways 81. A pair of jaws 82 are pivoted on a pin 83 on each slide and have pockets 84 which engage a barrel B. Each jaw is yieldingly urged toward the other by a spring 85 that urges a pin 86 against the jaw. The vertical position of each barrel between the jaws 82 is controlled by a stop 87 that is threaded into a bracket 88.

As previously noted, the slide 80 is moved vertically upwardly and downwardly by continuous cam 20. When a barrel B is delivered to the jaws 82, the slide 80 is in its lowermost position and then is successively elevated as the turret moves relative to the cam 20.

Operation

Referring to FIG. 2, as the machine is operating, the turret is continuously rotated and barrels B are fed by the feeding mechanism 21 to the pocket 28 in the feed table 22 and in turn to each pair of jaws 82 of the barrel holding chuck assembly 19. At the same time, the needle feeding mechanism 15 successively feeds needles to the grooves 53 and each needle then is guided by a groove 53 through a tube 16 to the open collet 60 which is held open during the needle feeding by engagement of the roller 75 with the cam 76.

After a needle has been fed into position and is held in predetermined relation to the collet 60 by the stop plate 77, the continued rotation of the turret brings the roller 75 out of engagement with the cam 76 so that the collet 60 closes about the needle. Continued rotation of the turret brings the needle into position adjacent the adhesive applying mechanism 30 which is operated in timed relation to present a charge of adhesive to the periphery of the needle (FIG. 3). Since the needle is now being continuously rotated, the entire circumference of the lower end of the needle is coated with adhesive. A typical adhesive applying mechanism which may be used is that made by Kenics Corporation of Danvers, Mass. under the designation Model 504.

As the turret continues to rotate, each barrel holding chuck 19 is moved upwardly to move a barrel B into position with a lower end of the needle and telescoped within the barrel B. As the turret further continues to rotate, a second cam 90 (FIG. 3) engages the roller 75 to open the collet and release the needle so that the needle is now only supported by the barrel B. Upon continued rotation of the turret, the barrel holding chuck assemblies 19 with a barrel and needle therein are lowered as shown in the left in FIG. 3 and the barrel B with a needle therein is delivered to the takeout table 31 where each pocket 32 strips the assembly of a barrel B and a needle from the barrel holding chuck assembly 19 and delivers it to the transfer chain 34.

I claim:

1. In an apparatus for assembling hypodermic needles and glass barrels, the combination comprising
a turret,
means for continuously rotating said turret,
a plurality of chucks mounted on said turret,
each said chuck being mounted for vertical movement on said turret in a direction generally parallel to the axis of rotation of said turret,
each said chuck having means thereon for gripping a barrel,
a plurality of needle holding chucks mounted on said turret for rotation with said turret and in overlying relation to said barrel holding chucks,
means for opening and closing said needle chucks as the turret rotates,
guide means individual to each said needle chuck for guiding a needle to said needle chuck,
said guide means being rotatable with said needle chuck,
means at a station along the path of movement of said guide means for feeding needles successively to successive guide means,
adhesive applying means at a point along the path of said needles,
means for moving said barrel holding chuck upwardly and downwardly as the turret rotates to move a barrel into position where the needle that is held above said barrel by the needle holding chuck is inserted in said barrel,
and means for operating said needle holding chuck and said barrel holding chuck such that a needle is inserted and gripped in each needle holding chuck, adhesive is applied to said needle in said needle holding chuck, and a barrel is moved upwardly toward said needle in said needle holding chuck,
and said needle holding chuck is opened and the barrel holding chuck with the needle attached is thereafter lowered to move said assembled needle and barrel downwardly and thereby move the needle out of the needle holding chuck,
and means for removing an assembled needle and barrel from the apparatus.

2. The combination set forth in claim 1 wherein said means for opening and closing said needle holding chuck comprises cam means for circumferentially spaced points along the path of said needle holding chucks.

3. The combination set forth in claim 1 wherein said means for raising and lowering said barrel holding chuck comprises cam means along the path of said barrel holding chucks operable to raise and lower said barrel holding chucks as the table is rotated.

4. The combination set forth in claim 1 wherein each said barrel holding chuck comprises a slide,
a plurality of fingers,
means yieldingly urging said fingers toward one another,
and stop means for controlling the vertical position of said barrel in said chuck.

5. The combination set forth in claim 4 wherein said stop means comprises a threaded stop movable vertically on said slide.

6. The combination set forth in claim 4 wherein said slide has a roller on the lower end thereof,
and cam means on the base of said machine engaged by each said roller for moving and controlling the position of said barrel holding chuck slide vertically with respect to said turret.

7. The combination set forth in claim 1 wherein each said guide means for said needle holding chuck comprises a tube extending downwardly towards said chuck.

8. The combination set forth in claim 7 including a guide member having tapered walls associated with the upper end of each said tube.

9. The combination set forth in claim 8 wherein said tube extends downwardly and outwardly relative to the center of the turret.

10. In an apparatus for assembling hypodermic needles and glass barrels, the combination comprising
a turret,
means for continuously rotating said turret,
a plurality of chucks mounted on said turret,
each said chuck being mounted for vertical movement on said turret in a direction generally parallel to the axis of rotation of said turret,
each said chuck having means thereon for gripping a barrel,
a plurality of needle holding chucks mounted on said turret for rotation with said turret and in overlying relation to said barrel holding chucks,
means for rotating said chucks,
means for opening and closing said needle chucks as the turret rotates,
guide means individual to each said needle chuck for guiding a needle to said needle chuck,
said guide means being rotatable with said needle chuck,
means at a station along the path of movement of said guide means for feeding needles successively to said guide means,
adhesive applying means at a point along the path of said needles,
and means for moving said barrel holding chuck upwardly and downwardly as the turret rotates to move a barrel into position where the needle that is held above said barrel by the needle holding chuck is inserted in said barrel.

11. The combination set forth in claim 10 wherein said means for opening and closing said needle chuck comprises cam means at circumferentially spaced points along the path of said needle holding chucks.

12. The combination set forth in claim 10 wherein said means for raising and lowering said barrel holding chuck comprises cam means along the path of said barrel holding chucks operable to raise and lower said barrel holding chucks as the table is rotated.

13. The combination set forth in claim 10 wherein each said barrel chuck comprises a slide,
a plurality of fingers,
means yieldingly urging said fingers toward one another,
and stop means for controlling the vertical position of said barrel in said chuck.

14. The combination set forth in claim 13 wherein said stop means comprises a threaded stop movable vertically on said slide.

15. The combination set forth in claim 13 wherein said slide has a roller on the lower end thereof,
and cam means on the base of said machine engaged by each said roller for moving and controlling the position of said barrel holding chuck slide vertically with respect to said turret.

16. The combination set forth in claim 10 wherein each said guide means for said needle holding chuck comprises a tube extending downwardly towards said chuck.

17. The combination set forth in claim 16 including a guide member having tapered walls associated with the upper end of said tube.

18. The combination set forth in claim 17 wherein said tube extends downwardly and outwardly relative to the center of the turret.

19. In an apparatus for assembling hypodermic needles and glass barrels, the combination comprising
a plurality of chucks,
means for moving said chucks in an endless path,
each said chuck being mounted for vertical movement in a direction generally transverse to the endless path of movement,
each said chuck having means thereon for gripping a barrel,
a plurality of needle holding chucks mounted for movement in said endless path and in overlying relation to said barrel holding chucks,
means for opening and closing said needle chucks as they are moved in said endless path,
guide means individual to each said needle chuck for guiding a needle to said needle chuck,
said guide means being rotatable with said needle chuck,
means at a station along the path of movement of said guide means for feeding needles successively to successive guide means,
adhesive applying means at a point along the path of said needles,
means for moving said barrel holding chuck upwardly and downwardly to move a barrel into position where the needle that is held above said barrel by the needle holding chuck is inserted in said barrel,
and means for operating said needle holding chuck and said barrel holding chuck such that a needle is inserted and gripped in each needle holding chuck, adhesive is applied to said needle in said needle holding chuck, and a barrel is moved upwardly toward said needle in said needle holding chuck,
and said needle holding chuck is opened and the barrel holding chuck with the needle attached is thereafter lowered to move said assembled needle and barrel downwardly and thereby move the needle out of the needle holding chuck,
and means for removing an assembled needle and barrel from the apparatus.

20. In an apparatus for assembling hypodermic needles and glass barrels, the combination comprising
a plurality of chucks,
means for moving said chucks in an endless path,
each said chuck being mounted for vertical movement in a direction generally transverse to the endless path of movement,
each said chuck having means thereon for gripping a barrel,
a plurality of needle holding chucks mounted for movement in said endless path and in overlying relation to said barrel holding chucks,
means for opening and closing said needle chucks as they are moved in said endless path,
guide means individual to each said needle chuck for guiding a needle to said needle chuck,
said guide means being rotatable with said needle chuck,
means at a station along the path of movement of said guide means for feeding needles successively to successive guide means,
adhesive applying means at a point along the path of said needles,
means for moving said barrel holding chuck upwardly and downwardly to move a barrel into position where the needle that is held above said barrel by the needle holding chuck is inserted in said barrel.

References Cited

UNITED STATES PATENTS

| | | | |
|---|---|---|---|
| 2,192,106 | 2/1940 | Ross et al. | 29—208 |
| 2,642,920 | 6/1953 | Simon et al. | 161—93 |
| 3,299,495 | 3/1965 | Wysocki | 29—208 |

THOMAS H. EAGER, *Primary Examiner.*